United States Patent
Yun et al.

(10) Patent No.: US 7,787,425 B2
(45) Date of Patent: Aug. 31, 2010

(54) INFORMATION UPDATE METHOD FOR ACCESS POINTS, AND HANDOFF SUPPORT APPARATUS AND METHOD USING THE SAME

(75) Inventors: Chanphill Yun, Gwacheon-si (KR); Minjung Kim, Seoul (KR); Eunkyo Kim, Seoul (KR); Jinho Son, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 1072 days.

(21) Appl. No.: 11/459,614

(22) Filed: Jul. 24, 2006

(65) Prior Publication Data

US 2007/0019597 A1 Jan. 25, 2007

(30) Foreign Application Priority Data

Jul. 25, 2005 (KR) ............... 10-2005-0067559
Sep. 2, 2005 (KR) ............... 10-2005-0081612

(51) Int. Cl.
*H04W 4/00* (2009.01)
(52) U.S. Cl. .............. 370/338; 370/401; 370/331; 455/436; 455/432.1
(58) Field of Classification Search .......... 370/338, 370/331, 401; 455/436, 432.1
See application file for complete search history.

(56) References Cited

U.S. PATENT DOCUMENTS

| | | | |
|---|---|---|---|
| 5,761,618 A | 6/1998 | Lynch | |
| 7,146,636 B2 * | 12/2006 | Crosbie | 726/7 |
| 2003/0185172 A1 * | 10/2003 | Rue | 370/331 |
| 2004/0224690 A1 * | 11/2004 | Choi et al. | 455/436 |
| 2004/0236939 A1 * | 11/2004 | Watanabe et al. | 713/150 |
| 2005/0083882 A1 | 4/2005 | Sayers | |
| 2005/0101293 A1 | 5/2005 | Mentze | |
| 2006/0223526 A1 * | 10/2006 | Qi et al. | 455/432.1 |

FOREIGN PATENT DOCUMENTS

| | | |
|---|---|---|
| CN | 1430860 | 7/2003 |
| CN | 1574986 | 2/2005 |
| WO | WO 03/079700 A1 | 9/2003 |

* cited by examiner

*Primary Examiner*—David Q Nguyen
(74) *Attorney, Agent, or Firm*—Lee, Hong, Degerman, Kang & Waimey

(57) ABSTRACT

If a hand-held terminal is connected to a single AP, the AP is provided from an administration server information of all the APs controlled by the administration server, transmits the information to the hand-held terminal, updates and stores it, and uses the updated and stored information of the APs to execute handoff. Basic lines and forwarding lines are disposed between all the APs and a private branch exchange, and a communication channel is formed using the basic lines to allow transferring the communication channel to the forwarding lines, thereby enabling to continuously perform a telephone communication session even if there is handoff during the telephone communication session using the hand-held terminal.

17 Claims, 7 Drawing Sheets

INFORMATION UPDATE METHOD FOR ACCESS POINTS, AND HANDOFF SUPPORT APPARATUS AND METHOD USING THE SAME

CLAIM FOR PRIORITY

This application is based on and claims priority to Korean Patent Application Nos. 2005-0067559 filed on Jul. 25, 2005 and 2005-0081612 filed on Sep. 2, 2005 in the Korean Intellectual Property Office (KIPO), the entire contents of which are hereby incorporated by reference.

BACKGROUND

This description relates to an information update method for access points (hereinafter referred to as APs) adapted to update information of a plurality of APs stored in a hand-held terminal, and a handoff support apparatus and a method using the same for supporting handoff of the hand-held terminal using the updated information of the APs.

A wireless personal area network (WPAN) is a communication network for enabling a small number of hand-held terminals to perform communication mutually using a wireless channel at a short distance within about 10 meters. A key concept in WPAN technology has been known as ultra wide band (UWB) communication, Bluetooth, wireless local area network (WLAN), Zigbee and infrared data association (IrDA).

The WPAN has been widely used for substituting the wireless communication for the wire communication of the terminals that are located within the short distance. Accordingly, the scope of application of the WPAN is expected to be broadened.

Recently, the Bluetooth spotlighted as a typical short distance communication technology has been increasingly developed since the Bluetooth standard version 1.0 was announced as an official standard by Bluetooth Special Interest Group (SIG) (Ericsson, Nokia, IBM, Toshiba and Intel). IEEE 802.15 Working Group was formed as an official group for international standards, and has been closely worked together with SIG for the purpose of establishing international standards based on the Bluetooth standard.

The Bluetooth version 1.0 provides a data transfer rate up to 1 Mbps. Considering a header of a packet, an effective data transfer rate is up to 723.2 kbps in one direction, 57.6 kbps in the other direction, and 433.9 kbps in both directions. A transmission distance is within about 10 m in 1 mW transmit power, and the transmit power is prescribed up to 100 mW.

The Bluetooth sets 79 channels each having a bandwidth of 1 MHz in an industrial scientific medical (ISM) frequency band of 2.4000~2.4835 GHz that can be used by users without licenses, and transmits data while changing channels about 1,600 times per second in a frequency hopping spread spectrum.

The Bluetooth can accurately transmit data in a wireless environment with heavy noises by using the frequency hopping spread spectrum and can avoid frequency interference by transmitting/receiving a predetermined packet and hopping the packet on a frequency of a new channel. Therefore, the Bluetooth can perform the hopping more quickly in the same frequency band over other systems, and can transmit data more stably using a shorter packet.

As the short distance communication technology is mounted to a hand-held terminal such as a mobile communication terminal, the hand-held terminal can receive a predetermined service provided by the AP by way of the hand-held terminal and the AP being interconnected via a short distance communication link. For example, an AP installed at every home and office is provided with a private branch exchange (PBX) system connected to a wire telephone network to allow the hand-held terminal to perform a short distance communication with the AP, by which a user can use the hand-held terminal to provide a telephone conversation service with the wire telephone network or a landline via the AP and the PBX system.

Furthermore, a single administration server is provided with a plurality of APs to form a group, and a hand-held terminal selectively connects with a single AP within the group according to a current position to thereby enable to receive a predetermined service provided by the group.

In case a hand-held terminal is to be connected to an AP, the AP that is connectible via a short distance communication link should be first searched, and authentication procedures with the searched AP should be performed to get an authentication for the connection. In order to get the authentication for the connection, each AP should be provided with an intrinsic address and a personal identification number (PIN) code. At the same time, the hand-held terminal should be pre-stored with the address and the PIN code of the AP.

In order to get awarded with the authentication for the connection, the hand-held terminal first searches for the AP to obtain the address thereof, and transmits to the AP a PIN code corresponding to the obtained address. The AP compares its own PIN code with the PIN code transmitted by the hand-held terminal to authorize the connection if both PIN codes are identical.

The hand-held terminal should be stored with a plurality of AP addresses and PIN codes in order for a single administration server to manage the plurality of APs, and for the hand-held terminal to be selectively connected with the plurality of APs.

The storage of the AP addresses and the PIN codes should be done by manipulation of the hand-held terminal by a user, which consumes much time and causes much inconvenience. As a result, a technique is required for enabling an easy storing of the AP addresses and PIN codes in the hand-held terminal.

SUMMARY

It is an object of the present invention to provide an information update method for access points (APs) by which a hand-held terminal can be provided from any one single AP with all the AP addresses and PIN codes within a group mounted with a plurality of APs and can update the AP addresses and the PIN codes if the hand-held terminal is connected to the single AP in the group and awarded with an authentication.

Another object is to provide a handoff support apparatus and method using updated information of APs by which handoff of a hand-held terminal is executed using the updated information of the APs.

Still another object is to provide a handoff support apparatus and method using updated information of APs by which a communication channel can be switched lest that a telephone communication session should be disconnected when handoff is effected in a condition where a PBX system connected to a public switched telephone network (PSTN) is installed within a group, and a hand-held terminal is connected to the PSTN via the AP and the PBX system.

According to the information update method for access points, in case a hand-held terminal requests a connection to a first AP out of a plurality of APs managed by a single administration server, and the hand-held terminal is connected by getting awarded authentication via a PIN code of the first AP, the first AP notifies a position information of the hand-held terminal to the administration server and updates the information. The administration server provides all the self-managed AP information to the first AP if the position information of the hand-held terminal is updated, and the first AP provides all the AP information to the hand-held terminal so as to be updated and stored.

The information update method for APs according to the present invention comprises: a hand-held terminal being connected to an AP by being awarded authentication to an AP; the AP obtaining all the information managed by an administration server from the administration server connected to itself and a local area network (LAN); and transmitting all the obtained AP information to the hand-held terminal to enable the hand-held terminal to update and store the pre-stored all the AP information.

According to the handoff support apparatus and method using updated information, basic lines and forwarding lines are installed between a plurality of APs and a PBX system. An administration server provides all the self-managed AP information to a hand-held terminal via a first AP so as to be updated and stored if the hand-held terminal is connected by getting awarded authentication from the first AP. If the hand-held terminal requests a telephone communication session, the first AP forms a communication channel using the basic line and allows the telephone communication session to be performed. If handoff of the telecommunicating hand-held terminal is necessitated, a second AP uses the updated information of the hand-held terminal to get an authentication to connection and gets connected. Furthermore, the PBX system forms a communication channel with the second AP over the forwarding line in response to request of the first AP such that a user can continuously perform the telephone communication session over the hand-held terminal.

Therefore, the handoff support apparatus using the updated information of APs comprises: a hand-held terminal performing a short distance communication; a plurality of APs connected to the hand-held terminal via the short distance communication link; a PBX system connected to a public switched telephone network (PSTN); basic lines respectively connected to the plurality of APs and the PBX system to form a communication channel; forwarding lines respectively connected to the plurality of APs and the PBX system to form a communication channel when the hand-held terminal hands off; and an administration server for controlling the updated storage of information of the plurality of APs in the hand-held terminal when the hand-held terminal is connected to the APs, and for controlling the plurality of APs such that handoff of the hand-held terminal can be managed.

Furthermore, the handoff support method using the information update method for APs comprises: a hand-held terminal being connected to a first AP by being awarded authentication to the first AP; the first AP obtaining all the information managed by an administration server from the administration server connected to itself and a local area network (LAN); and transmitting all the obtained AP information to the hand-held terminal to enable the hand-held terminal to update and store the pre-stored all the AP information; the first AP forming a communication channel with a PBX system to enable the hand-held terminal to perform a telephone communication session over a PSTN; the administration server determining handoff of the hand-held terminal, and handing off the hand-held terminal to a second AP if it is necessary to handoff; and forming a communication channel between the PBX system and the second AP to enable the hand-held terminal to continuously perform the telephone communication session over the PSTN.

DETAILED DESCRIPTION

Figure 1:
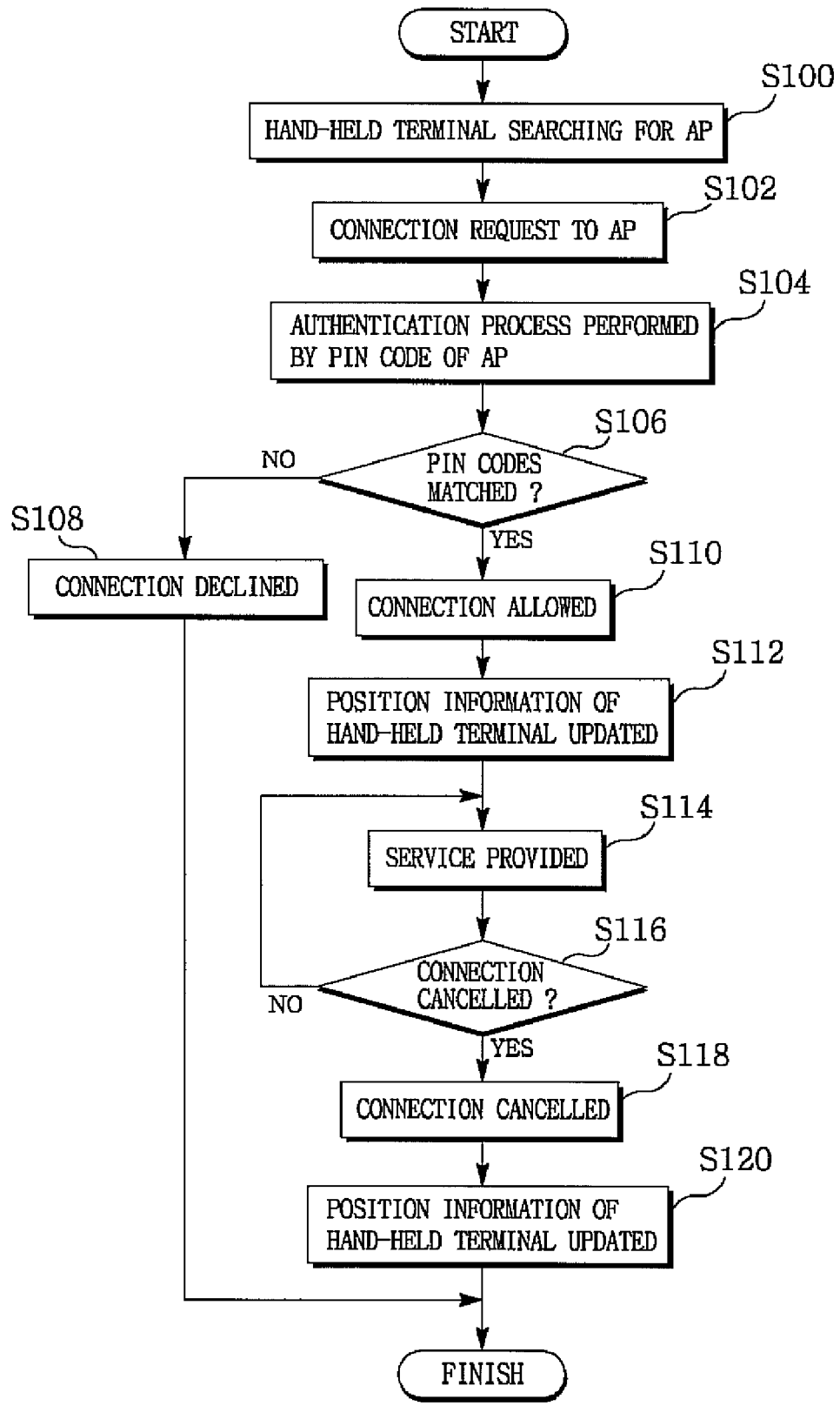
FIG. 1 is a signal flowchart illustrating a general method in which a hand-held terminal is connected to an AP.

Referring to FIG. 1, a hand-held terminal first searches for an AP in case the hand-held terminal is connected to the AP to receive a predetermined service (S100). The search of the AP is such that the hand-held terminal first performs an inquiry. The inquiry is such that the hand-held terminal transmits an inquiry message, and waiting operation of receiving an inquiry response relative to the transmitted inquiry message is repeatedly performed.

The inquiry message is transmitted using an inquiry access code so that a plurality of APs located within a short distance communication area can receive the message. The AP performs an inquiry scan so as to respond to the inquiry in case the inquiry message transmitted by the hand-held terminal is received. The inquiry response is such that the AP transmits to the hand-held terminal a frequency hopping synchronization (FHS) packet including its own address. Then, the hand-held terminal obtains the AP address that has transmitted the inquiry response. Once the AP is searched, the hand-held terminal requests a connection of the AP (S102). The AP then performs an authentication process of discriminating whether to permit the connection of the hand-held terminal (S104).

The authentication process is such that the AP requests the hand-held terminal a PIN code, and the hand-held terminal searches for a PIN code corresponding to the obtained AP address and transmits same to the AP. The AP compares the PIN code transmitted by the hand-held terminal with its own PIN code to discriminate whether they are matched (S106).

As a result of the comparison, if they are not matched, the AP declines permitting the connection of the hand-held terminal (S108). If they are matched, the AP determines that the hand-held terminal is a hand-held terminal having permission for connection, and permits the connection to allow the hand-held terminal to be connected via the short distance communication link, such that a predetermined data is mutually transmitted (S110).

Furthermore, the AP transmits to an administration server managing the AP a position information notifying that the hand-held terminal is connected to the AP and updates the information (S112). A predetermined data is exchanged between the hand-held terminal and the AP, and a predetermined service required by the hand-held terminal is provided (S114).

Under this circumstance, the AP discriminates whether connection with the hand-held terminal has been cancelled (S116). The cancellation of connection is determined when the AP deviates from the short distance communication area to be unable to perform the short distance communication. At the same time, the AP can determine the cancellation of connection in response to request of the hand-held terminal.

As a result of the determination, if the hand-held terminal has been disconnected, the AP cancels the connection with the hand-held terminal (S118), and the AP transmits position information to the administration server that the connection with the hand-held terminal has been cancelled, where the administration server updates the information (S120) and terminates the operation.

If the hand-held terminal is connected to the AP and provided with a predetermined service as described above, the hand-held terminal should receive the authentication of connection to the AP using the AP address and the PIN code. Therefore, the hand-held terminal should be pre-stored with the AP address and the PIN code.

In case a single administration system manages a plurality of APs to form a single group, and the hand-held terminal is selectively connected to the plurality of APs in the group according to its current position and receives services, the hand-held terminal should be pre-stored with addresses of the plurality of APs and the PIN codes belonging to the group. The storage of the AP addresses and the PIN codes is performed by a user manually manipulating the hand-held terminal, and it takes much time to manually store one by one the plurality of AP addresses and the PIN codes belonging to the group. Furthermore, the AP addresses and the PIN codes stored in the hand-held terminal should be updated and stored whenever the number of APs in the group is extended or reduced. Therefore, it is necessary to simply update and store in the hand-held terminal the plurality of AP addresses and the PIN codes forming a single group.

Figure 2:
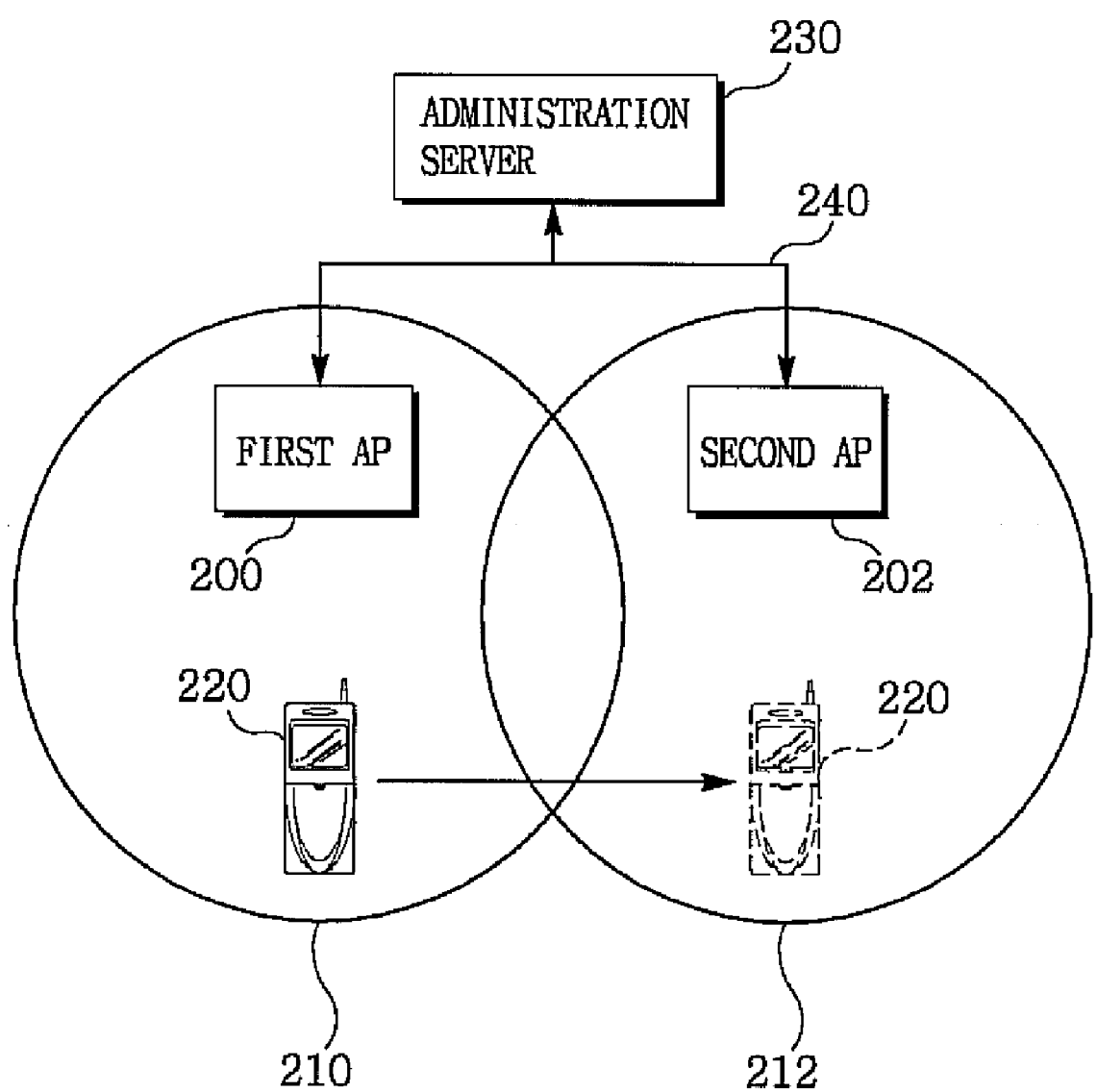
FIG. 2 is a block diagram illustrating a system construction in which an information update method according to the present invention is applied.

Now, referring to FIG. 2, reference numerals 200 and 202 respectively denote first and second APs. The first and second APs 200 and 202 are respectively connected to a hand-held terminal 220 located within their short distance communication areas 210 and 212 via the short distance communication link, and provide a predetermined service requested by the hand-held terminal 220.

Reference numeral 230 denotes an administration server. The administration server 230 and the first and second APs 200 and 202 are connected, for example, via a LAN 240 and exchange a predetermined information therebetween. The administration server 230 controls update and storage of information of the plurality of APs in the hand-held terminal 220 according to information update method of the present invention.

Figure 3:
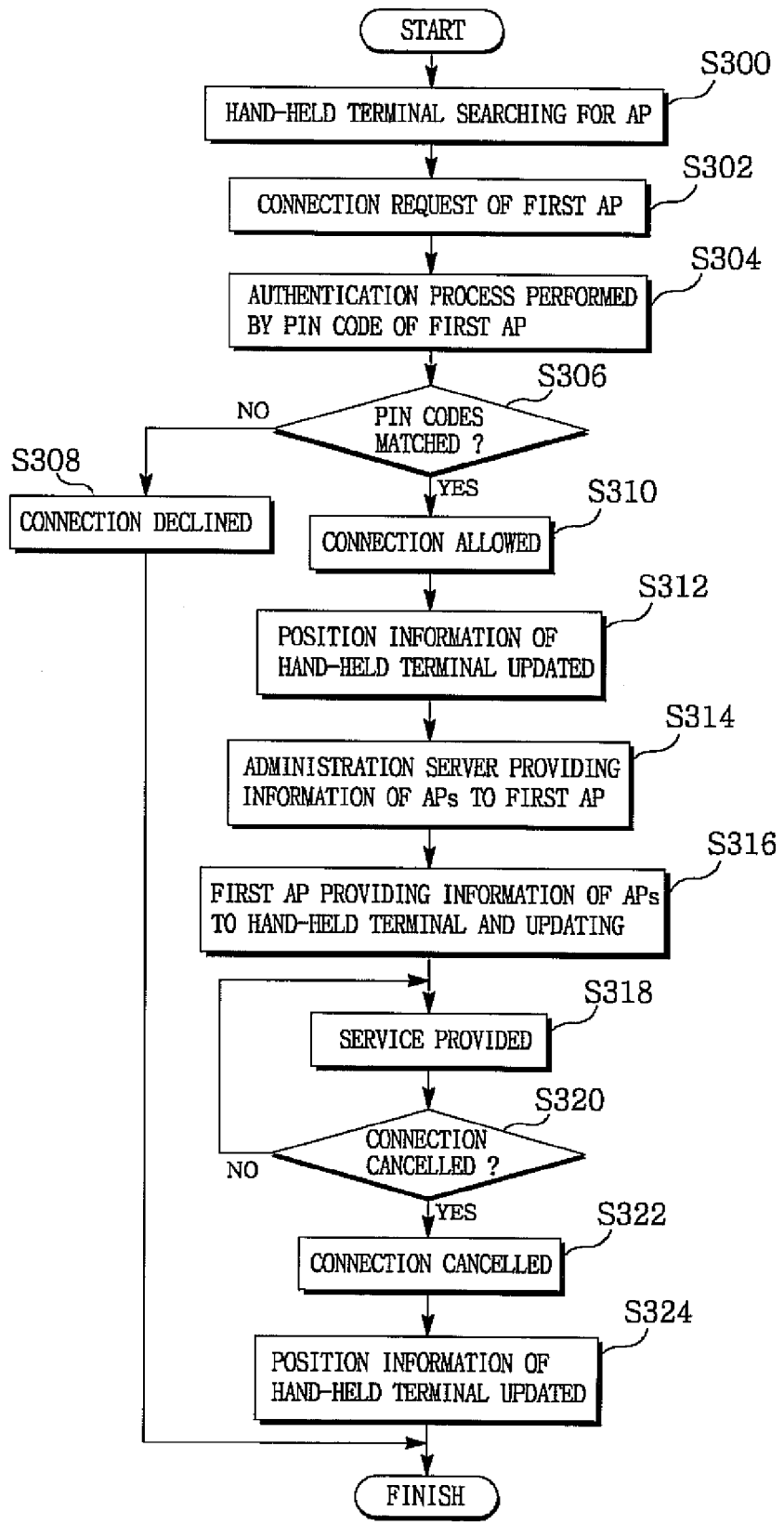
FIG. 3 is a signal flowchart illustrating an information update method according to the present invention.

Now, the information update method of the present invention applied to the system thus constructed will be described with reference to FIG. 3.

If the hand-held terminal 220 is connected to the first and second APs 200 and 202 to receive a predetermined service, the hand-held terminal 220 first searches for the APs 200 and 202 (S300). The search of the APs 200 and 202 is such that the hand-held terminal 220 performs the inquiry and the APs 200 and 202 perform the inquiry scan.

If the APs 200 and 202 are thus searched, the hand-held terminal 220 requests a connection to the APs 200 and 202 (S302). At this time, description is given on the assumption that the hand-held terminal 220 is located near to a short distance communication area 210 of the first AP 200, and the first AP 200 is searched in the search process, and the hand-held terminal 220 has requested a connection to the first AP 200.

Successively, the first AP 200 performs an authentication process of determining whether to allow a connection of the hand-held terminal 220 (S304), and the first AP 200 requests the hand-held terminal 220 of a PIN code, and the hand-held terminal 220 searches a PIN code corresponding to an address of the first AP 200 in response to the request and transmits the searched PIN code to the first AP 200. The AP 200 compares the PIN code transmitted by the hand-held terminal 220 with its PIN code to discriminate whether two PIN codes are matched (S306).

As a result of the discrimination, if it is determined that the two PIN codes are not matched, the first AP 200 declines the connection of the hand-held terminal 220 (S308). If the PIN codes are matched, the first AP 200 determines that the hand-held terminal 220 is a hand-held terminal 220 which is allowed the connection, and allows the connection to the hand-held terminal via the short distance communication link such that predetermined information can be exchanged between the first AP 200 and the hand-held terminal 220 (S310).

Furthermore, the first AP 200 transmits position information to its administration server 230 notifying that it is connected to the hand-held terminal 220 and updates the information (S312). Following the update of the position information of the hand-held terminal 220, the administration server 230 provides all the information of the currently administered APs, i.e., addresses and PIN codes of the first and second APs 200 and 202 connected to itself via the LAN 240, to the first AP 200 (S314).

Then, the first AP 200 transmits to the hand-held terminal 220 the addresses and PIN codes of the first and second APs 200 and 202 provided from the administration server 230, where the hand-held terminal 220 updates all the addresses and PIN codes of the APs 200 and 202 administrated by the administration server 230 and stores same (S316).

Under this circumstance, the first AP 200 exchanges predetermined information with the hand-held terminal 220 and provides a predetermined service requested by the hand-held terminal 220 (S318). The AP 200 then discriminates whether connection with the hand-held terminal 220 has been cancelled (S320). The connection cancellation can be discriminated by the time when the hand-held terminal 220 deviates from the short distance communication area of the first AP 200 to disable to perform the short distance communication. The connection cancellation can be also discriminated when there is a request of connection cancellation with the hand-held terminal 220. As a result of the discrimination, if the connection with the hand-held terminal 220 has been cancelled, the first AP 200 cancels the connection with the hand-held terminal 220 (S322), and transmits the position information to the administration server 230 notifying that the connection with the hand-held terminal 220 has been cancelled to update the position information of the hand-held terminal 220 (S324) and terminates the operation.

As noted above, the information update method of APs according to the present invention is such that only the address and PIN code of the first AP 2D0 out of the plurality of APs 200 and 202 are stored by a user manipulating the hand-held terminal 220. Furthermore, if the hand-held terminal 220 searches for the first AP 200 within the short distance communication area of the first AP 200, authorizes the connection and is then connected, the first AP 200 transmits all the addresses and PIN codes of the first and second AP managed by the administration server 230 to the hand-held terminal 220, where the hand-held terminal 220 updates the addresses and PIN codes and stores the same in a memory therein.

As a result, the addresses and PIN codes of the first and second APs 200 and 202 managed by the administration server 230 need not be stored in the hand-held terminal 220 one by one by a user. At the same time, the addresses and PIN codes of the APs can be simply updated and stored in the hand-held terminal 220 without recourse to manipulation of the hand-held terminal 220 by the user if the APs managed by the administration server 230 are to be increased or removed.

Figure 4:
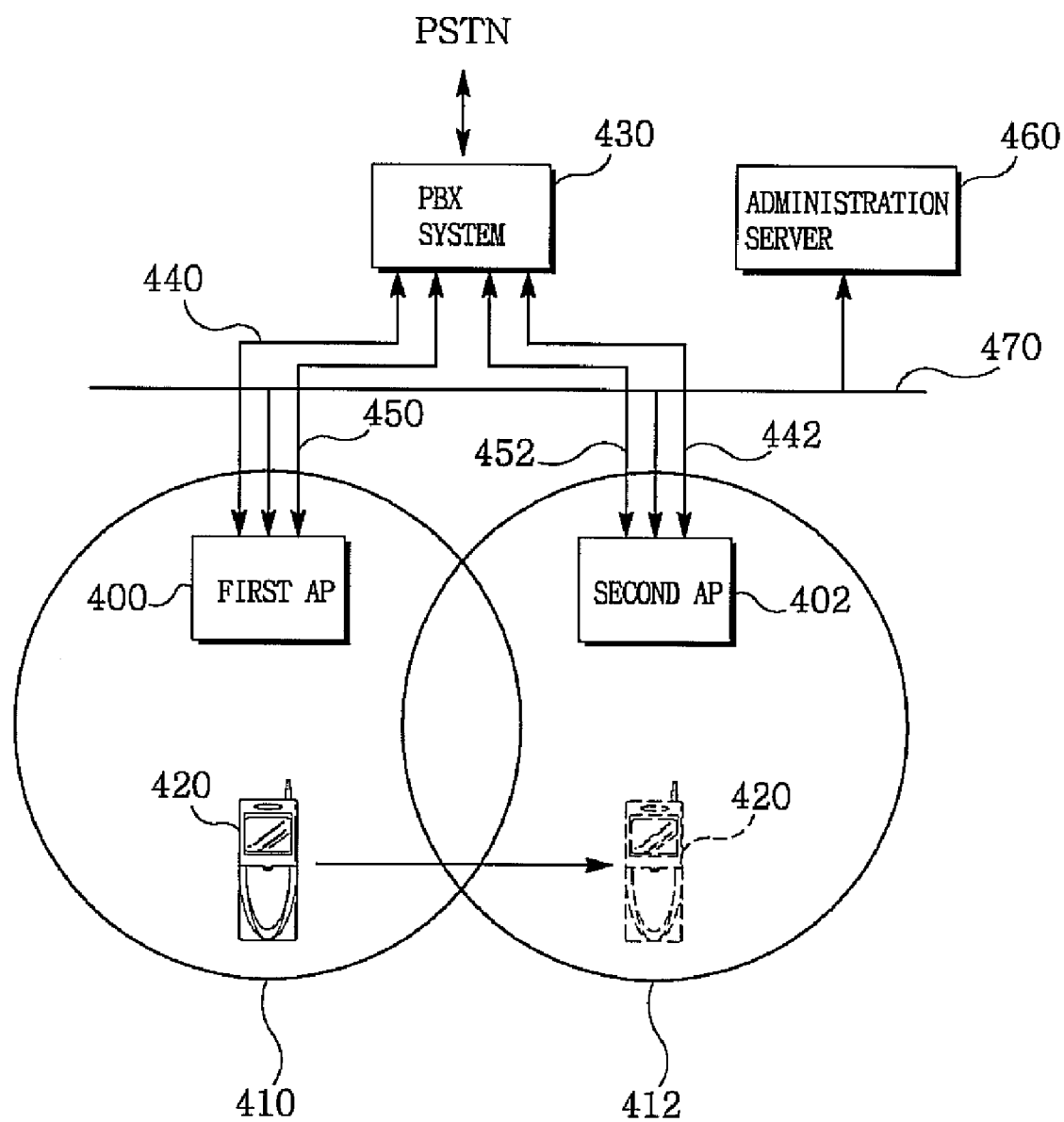
FIG. 4 is a block diagram illustrating a construction of a handoff support apparatus according to the present invention.

FIG. 4 illustrates a block diagram of a construction of handoff support apparatus by which information of the APs is updated by the hand-held terminal using the information update method thus described according to the present invention, and handoff is supported lest the telephone communication session be disconnected in case the telephone communication session is effected via the PSTN. Reference numerals 400 and 402 respectively denote a first AP and a second AP. The first and second APs are connected to a hand-held terminal 420 located within their wireless short distance communication areas 410 and 412 via a short distance communication link and provide a predetermined service requested by the hand-held terminal 420.

Reference numeral 430 defines a private branch exchange (PBX) system. The PBX system 430 is connected to the first and second APs via basic lines 440 and 442 and forwarding lines 450 and 452. The PBX system 430 forms a communication channel with the first and second APs 400 and 402 via the basic lines 440 and 442 when the hand-held terminal 420 is connected to the first and second APs 400 and 402 for telephone communication session.

Furthermore, when the hand-held terminal 420 is handoff, the PBX system 430 forms a communication channel via forwarding lines 452 and 450 of the second and first AP 402 and 400 to which the hand-held terminal 420 is connected handoff to allow the hand-held terminal 420 to continuously perform the telephone communication session.

Reference numeral 460 denotes an administration server. The administration server 460 and the first and second APs 400 and 402 are interconnected via a LAN 470 and exchange a predetermined data. The administration server 460 also controls the first and second APs 400 and 402 to control performance of the handoff of the hand-held terminal 420. Furthermore, the administration server 460 relays the numbers of the forwarding lines 450 and 452 for transferring the communication channels lest the telephone communication session of the hand-held terminal 420 be disconnected when the hand-held terminal 420 performs the handoff during the telephone communication session.

In the handoff support apparatus thus configured according to the present invention, it is assumed that the hand-held terminal 420 is located within the short distance wireless communication area 410 of the first AP 400, and a telephone communication session is performed via the PSTN. The hand-held terminal 420 performs a search operation to search for the first AP 400, and requests a connection to the searched first AP 400. The first AP 400 performs an authentication process of discriminating whether to allow connection of the hand-held terminal 220 in response to the connection request. The authentication process is such that the first AP 400 requests a PIN code, and the hand-held terminal 400 transmits to the first AP 400 a pre-stored PIN code of the first AP 400 according to the request.

The first AP 400 permits the connection of the hand-held terminal 420 if the PIN code transmitted by the hand-held terminal 420 and its own PIN code are matched. If the first AP 400 and the hand-held terminal 420 are connected, the first AP 400 transmits position information notifying to the administration server 460 that the hand-held terminal 420 has been connected to itself. The administration server 460 updates the position information stored therein, and provides to the first AP 400 addresses and PIN codes of the first and second APs 400 and 402 currently administered by itself.

The first AP 400 transmits to the hand-held terminal 420 the addresses and PIN codes of the first and second APs 400 and 402 provided by the administration server 460, where the hand-held terminal 420 updates the addresses and PIN codes of the first and second APs 400 and 402 administered by the administration server 460 and stores the same.

If the hand-held terminal 420 requests a telephone communication session under this circumstance, the first AP 400 forms a communication channel with the PBX 430, thereby enabling to perform the telephone communication session via the PSTN (S520).

If handoff of the hand-held terminal 420 is necessary under this circumstance, the administration server 460 instructs the handoff to the first and second APs 400 and 402. Thereafter, the first APs 400 notifies the handoff to the hand-held terminal 420 and cancels the connection.

If the connection between the first AP 400 and the hand-held terminal 420 is cancelled, the second AP 402 requests the hand-held terminal 420 to connect, and performs the authentication process with the PIN code of the second AP 402 and gets connected. If the second AP 402 and the hand-held terminal 420 are connected, the administration server 460 notifies to the first AP 400 the number of the forwarding line 452 connected between the second AP 402 and the PBX 430. The first AP 400 requests the PBX 430 of forwarding via the forwarding line 452 of the second AP 402. The PBX 430 forms a communication channel via the forwarding line 452 of a relevant number in response to the request of the forwarding of the first AP 400, such that the hand-held terminal 420 can continuously perform the telephone communication session via the second AP 402.

Figure 5A:
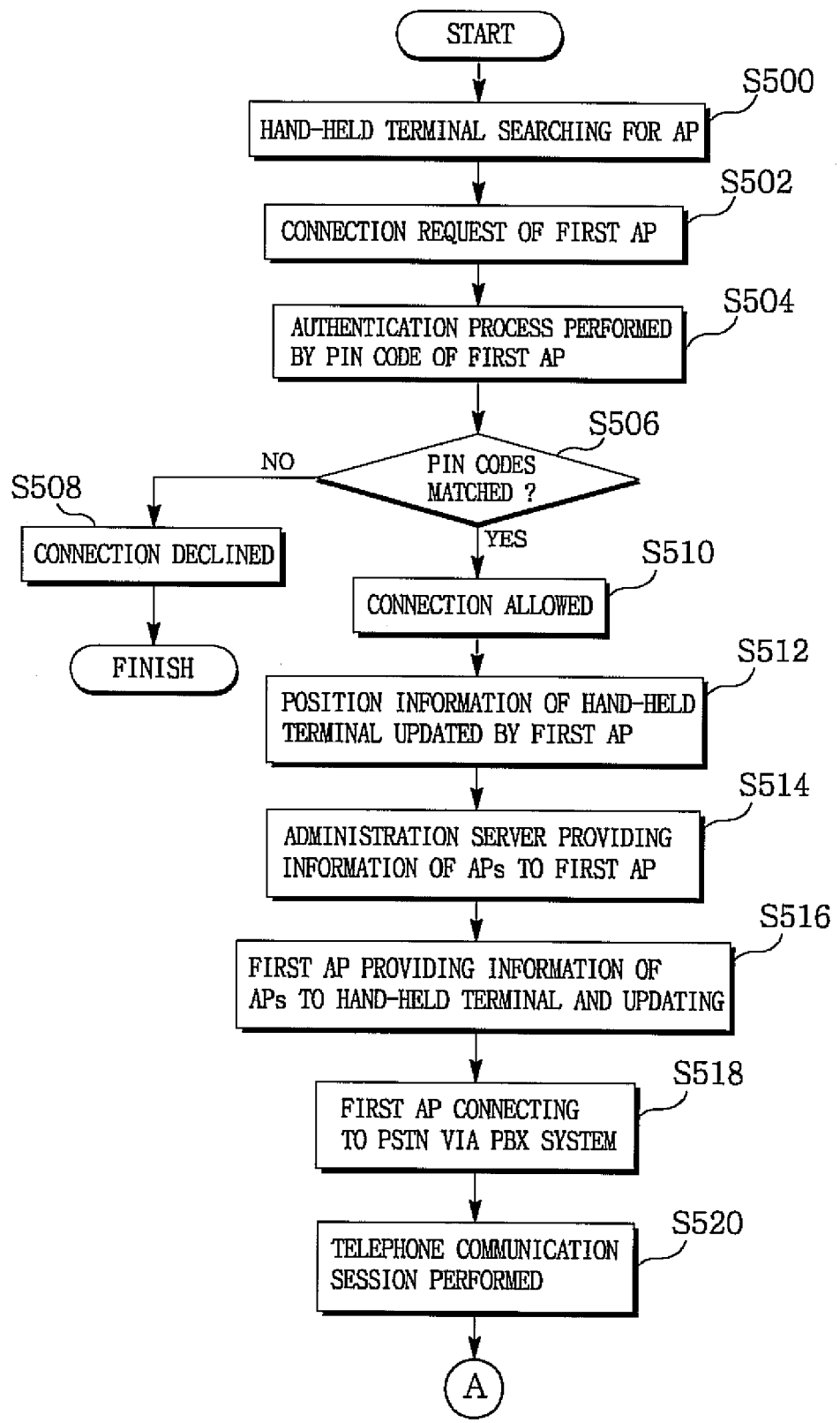
FIGS. 5a, 5b and 5c are signal flowcharts illustrating an operation in which handoff is performed in connecting method according to the present invention.
Figure 5B:
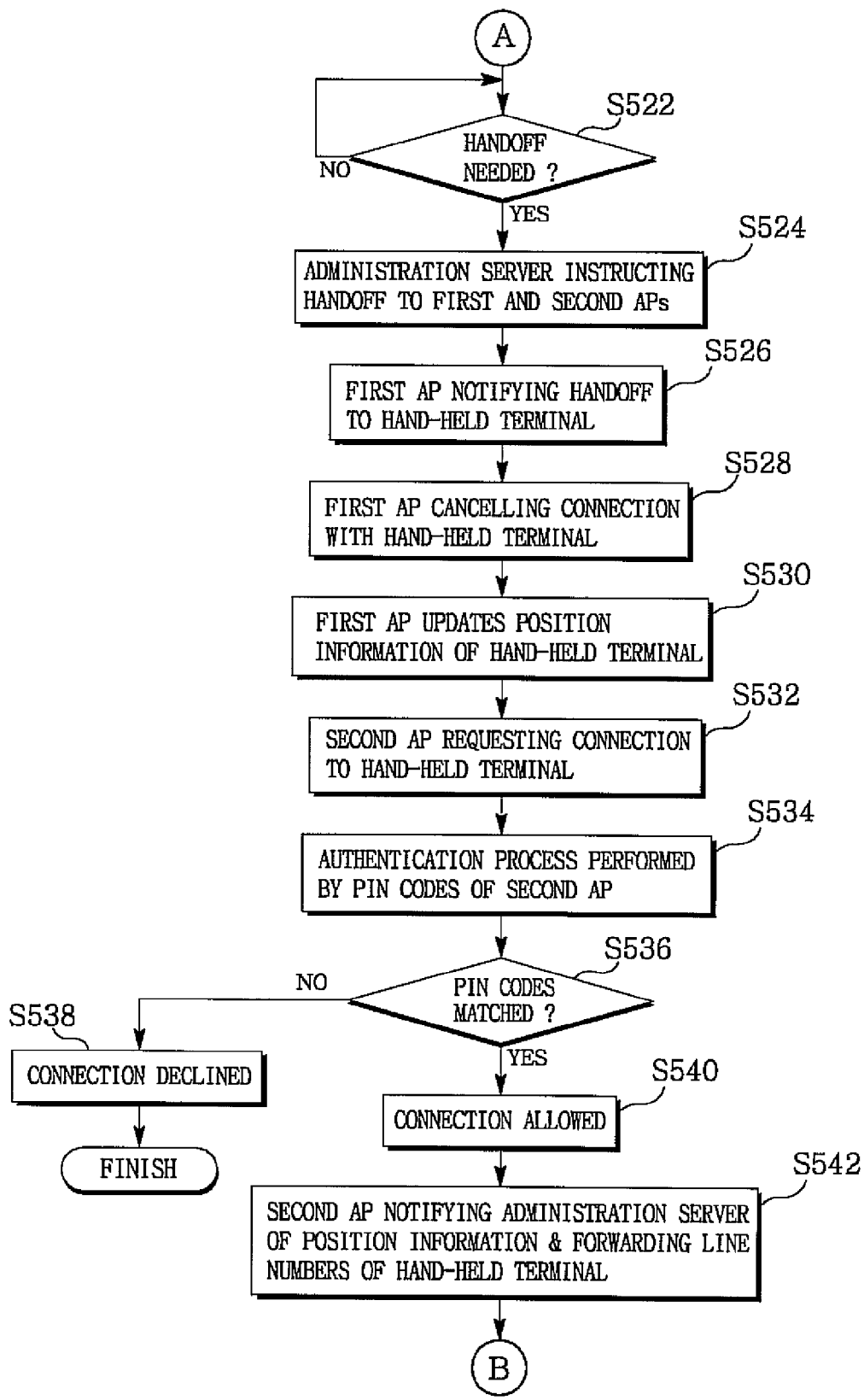
Figure 5C:
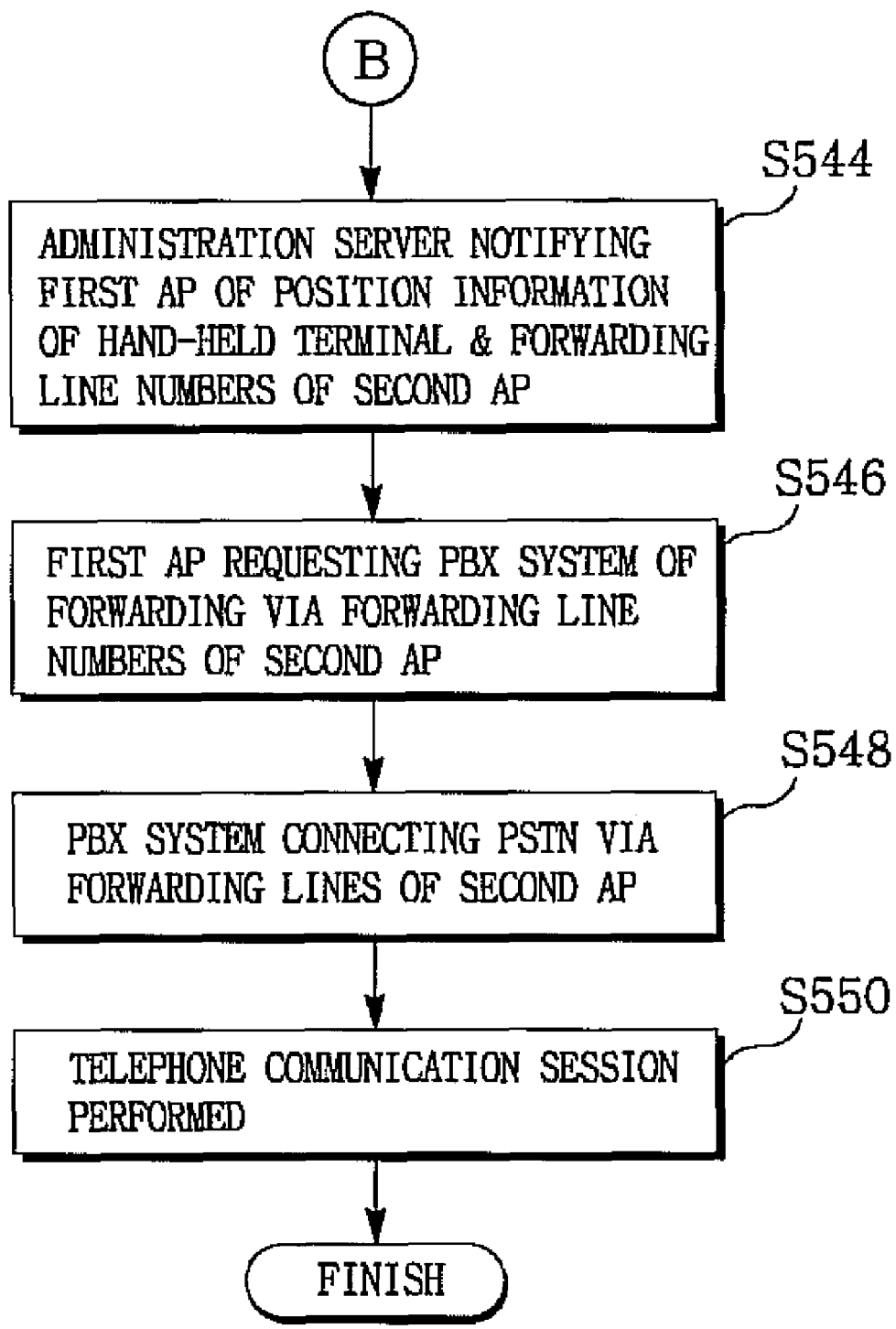

Referring to FIG. 5, the hand-held terminal 420 performs a search operation while being located within the wireless short distance area 410 of the first AP 400 to search for the first AP 400 (S500). The search operation as noted above is such that the hand-held terminal 420 performs the inquiry, and the first AP 400 performs the inquiry scan to allow the hand-held terminal 420 to search for the first AP 400.

The hand-held terminal 420 requests a connection to the searched first AP 400 (S502), and the first AP 400 performs an authentication procedure of discriminating whether to permit a connection of the hand-held terminal 420 (S504). The authentication procedure is, as described above, that the first AP 400 requests the hand-held terminal 420 of a PIN code of the first AP 400, and the hand-held terminal 420 transmits to the first AP 400 a pre-stored PIN code of the first AP 400 in response to request of the first AP 400.

The first AP 400 compares the PIN code transmitted by the hand-held terminal 420 with its own PIN code to discriminate whether they are matched (S506).

As a result of the discrimination, if two PIN codes are not identical, the first AP 400 declines the connection of the hand-held terminal 420 (S508). If the two PIN codes are matched, the first AP 400 determines that the hand-held terminal 420 is a hand-held terminal that is permitted the connection, and permits the hand-held terminal 420 to be connected via the short distance communication link and exchanges a predetermined data therebetween (510).

The first AP 400 transmits to its own administration server 460 the position information notifying that the hand-held terminal 460 has been connected to itself and updates the information (S512). If the position information of the hand-held terminal 420 is updated, the administration server 460 provides to the first AP 400 the addresses and PIN codes of the first and second APs 400 and 402 currently controlled by itself (S514).

The first AP 400 transmits to the hand-held terminal 420 the addresses and PIN codes of the first and second APs 400 and 402 provided by the administration server 460, and the hand-held terminal 420 updates the addresses and PIN codes of the first and second APs 400 and 402 controlled by the administration server 460 and stores the same (S516).

If the hand-held terminal 420 requests a telephone communication session via the PSTN under the current circumstance, the first AP 400 forms a communication channel (S518) via the basic line 440 and connects the hand-held terminal to the PSTN 420 sequentially via the first AP 400, the basic line 440 and the PBX 430, thereby enabling to perform a telephone communication session (S520).

Under this circumstance, the administration server 460 discriminates whether handoff of the hand-held terminal 420 is needed (S522). The discrimination of the handoff of the hand-held terminal 420 is such that a received signal strength indicator (RSSI) is detected by a signal which the first and second APs 400 and 402 receive from the hand-held terminal 420, and the detected RSSI is transmitted to the administration server 460, where the administration server 460 determines the handoff by the RSSI transmitted from the first and second APs 400 and 402.

As a result of the determination, if the handoff is needed, the administration server 460 instructs the handoff to the first and second APs 400 and 402 (S524). In other words, the first AP 400 cancels the connection with the hand-held terminal 420, and the second AP 402 instructs the handoff so as to connect to the hand-held terminal 420.

Successively, the first AP 400 notifies the handoff to the hand-held terminal 420 (S526), and cancels the connection with the hand-held terminal 420 (S528). The first AP 400 transmits to the administration server 460 position information notifying that connection with the hand-held terminal 420 has been cancelled so that the position information of the hand-held terminal 420 can be updated (S530).

Furthermore, the second AP 402 requests a connection to the hand-held terminal 420 (S532) and performs an authentication process via the PIN code of the second AP 402 (S534). The authentication process is such that the second AP 402 requests the hand-held terminal 420 of the PIN code of the second AP 402, and the hand-held terminal 420 searches for the PIN code of the second AP 402 provided and updated from the first AP 400 at the step of S516 in response to the request of the second AP 402 and transmits it to the second AP 402.

The second AP 402 compares the PIN code transmitted by the hand-held terminal 420 with its own PIN code to discriminate whether they are matched (S536). As a result of the discrimination, if two PIN codes are not identical, the first AP 400 declines the connection of the hand-held terminal 420 (S538). If the two PIN codes are matched, the second AP 402 determines that the hand-held terminal 420 is a hand-held terminal that is permitted the connection, and permits the hand-held terminal 420 to be connected via the short distance communication link (S540). The second AP 402 notifies to the administration server 460 the position information that the hand-held terminal 420 is connected to the second AP 402, and the number of forwarding line 452 connected between the second AP 402 and the PBX 430 (S542).

The administration server 460 updates the position information notifying that the hand-held terminal 420 has been connected to the second AP 402, and notifies to the first AP 400 the position information notifying that the hand-held terminal 420 is connected to the second AP 402, and the number of the forwarding line 452 connected between the second AP 402 and the PBX 430 to request the forwarding (S544).

The first AP 400 requests the PBX 430 to forward a communication channel via the forwarding line 452 of the second AP 402 (S546). The PBX 430 connects the PSTN via the forwarding line 452 of a relevant number in response to the request of the first AP 400 to form a communication channel (S548). In other words, the PBX 430 connects the PSTN via the forwarding line 452 connected to the second AP 402 to form a communication channel.

As a result, the hand-held terminal 420 connected to the second AP 402 can be continuously connected to the communication channel such that a user can keep on performing the telephone communication sessions without interruption (S550).

As described above, the handoff support apparatus and method according to the present invention is such that a hand-held terminal stores only an address and a PIN code of a single AP out of a plurality of APs administered by an administration server, and if an authentication to a connection is accepted from a single AP, all the addresses and PIN codes of the plurality of APs controlled by the administration server can be provided, updated and stored. Therefore, the hand-held terminal can perform handoff even if it is not pre-stored with addresses and PIN codes of the plurality of APs controlled by the administration server.

Furthermore, if basic lines and forwarding lines are provided between the AP and a PBX, the hand-held terminal is handoff while being connected to a single AP and a communication channel is formed via the basic line to perform a telephone communication session, the communication channel is transferred to the forwarding line of the AP to enable the hand-held terminal to continuously perform the telephone communication sessions without the communication channel being interrupted.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An information update method for access points (APs), the method comprising:
   connecting a hand-held terminal to one of the APs when the hand-held terminal is authenticated by the one of the APs;
   obtaining, from an administration server by the APs, information of all APs connected to the administration server via a local area network (LAN) and managed by the administration server; and
   transmitting the obtained information from the APs to the hand-held terminal to enable the hand-held terminal to update pre-stored information and store the obtained information,
   wherein connecting the hand-held terminal comprises:
      requesting a connection to the one of the APs by the hand-held terminal,
      requesting information by the one of the APs authenticating the requested connection from the hand-held terminal in response to the connection request, transmitting the requested information from the hand-held terminal to the one of the APs in response to the information request, and
authenticating the requested connection such that the one of the APs connects to the hand-held terminal if the requested information transmitted by the hand-held terminal matches information pre-stored in the one of the APs.

2. An information update method for access points (APs), the method comprising:
connecting a hand-held terminal to one of the APs when the hand-held terminal is authenticated by the one of the APs;
obtaining, from an administration server by the APs, information of all APs connected to the administration server via a local area network (LAN) and managed by the administration server;
transmitting the obtained information from the APs to the hand-held terminal to enable the hand-held terminal to update pre-stored information and store the obtained information; and
executing an inquiry by the hand-held terminal and executing an inquiry scan by the one of the APs to allow the hand-held terminal to search for the one of the APs prior to the hand-held terminal requesting a connection to the one of the APs,
wherein connecting the hand-held terminal comprises:
requesting the connection to the one of the APs by the hand-held terminal,
requesting information by the one of the APs authenticating the requested connection from the hand-held terminal in response to the connection request,
transmitting the requested information from the hand-held terminal to the one of the APs in response to the information request, and
authenticating the requested connection such that the one of the APs connects to the hand-held terminal if the requested information transmitted by the hand-held terminal matches information pre-stored in the one of the APs.

3. An information update method for access points (APs), the method comprising:
connecting a hand-held terminal to one of the APs when the hand-held terminal is authenticated by the one of the APs;
obtaining, from an administration server by the APs, information of all APs connected to the administration server via a local area network (LAN) and managed by the administration server;
transmitting the obtained information from the APs to the hand-held terminal to enable the hand-held terminal to update pre-stored information and store the obtained information; and
authenticating the requested connection such that the one of the APs connects to the hand-held terminal if the requested information transmitted by the hand-held terminal matches information pre-stored in the one of the APs,
wherein connecting the hand-held terminal comprises:
requesting the connection to the one of the APs by the hand-held terminal,
requesting information by the one of the APs authenticating the requested connection from the hand-held terminal in response to the connection request,
transmitting the requested information from the hand-held terminal to the one of the APs in response to the information request, and
wherein the requested information authenticating the requested connection is a personal identification number (PIN) code of the requesting one of the APs.

4. An information update method for access points (APs), the method comprising:
connecting a hand-held terminal to one of the APs when the hand-held terminal is authenticated by the one of the APs;
obtaining, from an administration server by the APs, information of all APs connected to the administration server via a local area network (LAN) and managed by the administration server; and
transmitting the obtained information from the APs to the hand-held terminal to enable the hand-held terminal to update pre-stored information and store the obtained information,
wherein the obtained information comprises information related to authenticating the hand-held terminal in order to connect to the APs, and
wherein the information related to authenticating the hand-held terminal in order to connect to the APs comprises addresses and personal identification number (PIN) codes of the APs.

5. A handoff support method using the information update method for APs comprising:
a hand-held terminal being connected to a first AP by being awarded authentication to the first AP; the first AP obtaining all the information managed by an administration server from the administration server connected to itself and a local area network (LAN); and transmitting all the obtained AP information to the hand-held terminal to enable the hand-held terminal to update and store the pre-stored all the AP information; the first AP forming a communication channel with a PBX system to enable the hand-held terminal to perform a telephone communication session over a PSTN; the administration server determining handoff of the hand-held terminal, and handing off the hand-held terminal to a second AP if it is necessary to handoff; and forming a communication channel between the PBX system and the second AP to enable the hand-held terminal to continuously perform the telephone communication session over the PSTN.

6. The method as defined in claim 5, wherein the step of the hand-held terminal being connected to the first AP comprises:
the hand-held terminal requesting the connection to the first AP; the first AP requesting the hand-held terminal of information authenticating the connection in response to the connection request; the hand-held terminal transmitting to the first AP the information authenticating the connection in response to the information request; and the first AP being connected by authenticating the connection of the hand-held terminal if information transmitted by the hand-held terminal and information pre-stored in the first AP are matched.

7. The method as defined in claim 6, further comprising a step of the hand-held terminal executing an inquiry and the first AP executing an inquiry scan to allow the hand-held terminal to search for the first AP, prior to the hand-held terminal requesting a connection to the first AP.

8. The method as defined in claim 6, wherein the information authenticating the connection requested by the first AP to the hand-held terminal is the first AP's own personal identification number (PIN) code.

9. The method as defined in claim 6, further comprising a step of the first AP notifying an administration server of position information of the hand-held terminal if the hand-held terminal is connected to the first AP.

10. The method as defined in claim 6, wherein the information of the APs updated and stored by the hand-held terminal is information in which the hand-held terminal receives authentication of connection to the APs.

11. The method as defined in claim 10, wherein the information in which the hand-held terminal receives authentication of connection to the APs comprises: addresses and PIN codes of the APs.

12. The method as defined in claim 5, wherein the formation of communication channel between the first AP and the PBX system is done by basic lines.

13. The method as defined in claim 5, wherein the determining the handoff of the hand-held terminal is done by a received signal strength indicator (RSSI) detected by a signal received by the first and second APs from the hand-held terminal.

14. The method as defined in claim 5, wherein the handoff comprises: the administration server instructing handoff to the first and second APs; the first AP notifying the handoff to the hand-held terminal and canceling the connection; and the second AP being connected to the hand-held terminal if the connection between the hand-held terminal and the first AP is cancelled.

15. The method as defined in claim 14, further comprising a step of the first AP notifying to the administration server the connection cancellation with the hand-held terminal after the connection between the hand-held terminal and the first AP is cancelled.

16. The method as defined in claim 14, wherein the step of transferring the communication channel comprises: the second AP notifying the administration server of a connection with the hand-held terminal; the administration server notifying the first AP of the connection between the second AP and the hand-held terminal; the first AP requesting the PBX system of the connection of the communication channel to the second AP; and the PBX system connecting the communication channel to the second AP.

17. The method as defined in claim 16, wherein the connection of the communication channel is done by forwarding lines between the PBX system and the second AP.

* * * * *